US006773650B1

(12) United States Patent
Longo

(10) Patent No.: US 6,773,650 B1
(45) Date of Patent: Aug. 10, 2004

(54) PRESTRESSED CONCRETE CASTING APPARATUS AND METHOD

(75) Inventor: Adriel Emilio Longo, San Juan, PR (US)

(73) Assignee: Power Poles, Inc., Rio Grande, PR (US)

(*) Notice: Subject to any disclaimer, the term of this patent is extended or adjusted under 35 U.S.C. 154(b) by 617 days.

(21) Appl. No.: 09/812,595

(22) Filed: Mar. 21, 2001

(51) Int. Cl.$^7$ .......................... B28B 1/14; B29C 39/02

(52) U.S. Cl. ...................... 264/228; 264/299; 264/333; 425/111

(58) Field of Search ............................ 264/228, 299, 264/333; 425/111

(56) References Cited

U.S. PATENT DOCUMENTS

| | | | |
|---|---|---|---|
| 780,321 | A | 1/1905 | Burkholder et al. |
| 832,594 | A | 10/1906 | Coller |
| 994,912 | A | 6/1911 | Elliott |
| 1,593,696 | A | 7/1926 | Hyden et al. |
| 1,762,815 | A | 6/1930 | Gloeser |
| 3,260,494 | A | 7/1966 | Deigaard |
| 3,489,626 | A | 1/1970 | Rubenstein |
| 3,583,047 | A | 6/1971 | Uchiyama |
| 3,652,756 | A | 3/1972 | Van Buren |
| RE27,732 | E | 8/1973 | Van Buren |
| 3,963,056 | A | 6/1976 | Shibuya et al. |
| 3,993,419 | A | 11/1976 | Mori et al. |
| 4,178,338 | A | 12/1979 | Bondpers et al. |
| 4,247,516 | A | 1/1981 | Morgan |
| 4,273,740 | A | 6/1981 | Marchesi et al. |
| 4,421,710 | A | 12/1983 | Borcoman |
| 4,758,393 | A | 7/1988 | Cazenave et al. |
| 5,240,395 | A | 8/1993 | O'Conner et al. |
| 5,819,487 | A | 10/1998 | Bull et al. |

*Primary Examiner*—Stephen J. Lechert, Jr.
(74) *Attorney, Agent, or Firm*—Banner & Witcoff, Ltd.

(57) ABSTRACT

A prestressed concrete casting apparatus includes a prestressing element (e.g., wire cable or rod) pretensioning fixture of simple easy to use construction, and great strength/rigidity for withstanding considerable pretensioning forces. Advantageously, a clamshell-type mold form may be used together with the pretensioning fixture, in such a manner that the mold form is easily properly locatable on the pretensioning fixture. The form can be removed for reuse without moving the pretensioning fixture or otherwise disturbing the casting, which is permitted to continue to cure in the stationary pretensioning fixture. Maintaining the pretensioning fixture stationary during the process lends greater structural integrity and stability to the pretensioning fixture under the considerable forces set-up by the pretensioning of the prestressing elements.

4 Claims, 10 Drawing Sheets

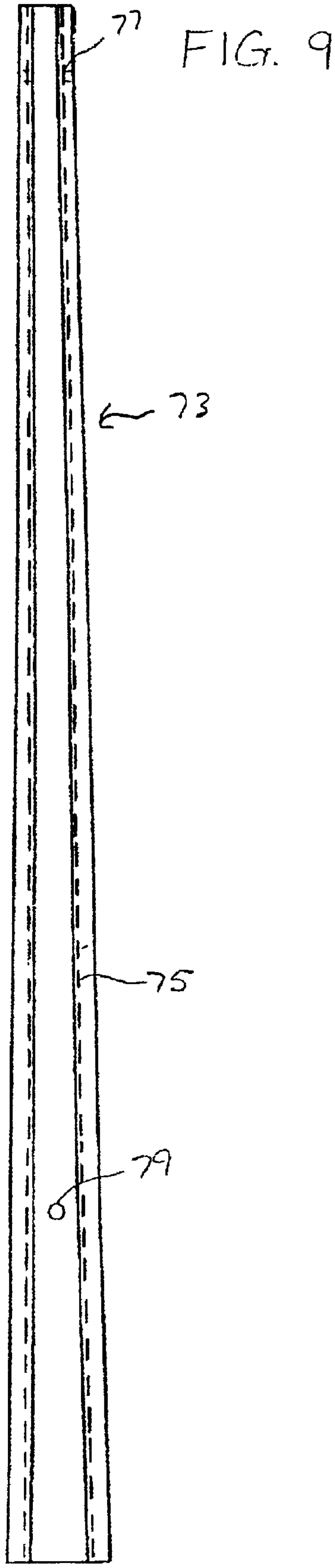
FIG. 9
FIG. 10
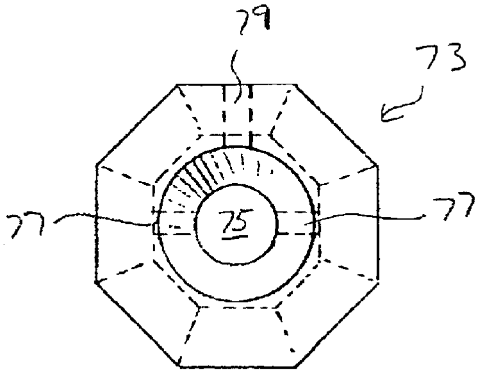

PRESTRESSED CONCRETE CASTING APPARATUS AND METHOD

TECHNICAL FIELD

The present invention relates generally to concrete casting methods and apparatus, and particularly to methods and apparatus for casting elongated prestressed concrete structures, e.g., utility poles. More specifically, the invention concerns the casting of prestressed concrete utility poles of octagonal cross-section.

BACKGROUND OF THE INVENTION

Concrete casting of utility poles, e.g., poles used for supporting lighting fixtures and/or utility lines, is known. Such elongated structures have been cast in various cross-sectional shapes, e.g., circular, rectangular and octagonal. In a conventional process, concrete slurry is poured into a mold having the desired shape and is allowed to cure before removal of the mold from the casting (or removal of the casting from the mold). Typically, the mold contains reinforcement elements, e.g., rebar running longitudinally within the mold, that become part of the cast product and impart additional tensile strength to the cast concrete (which by itself has high compressive strength but very low tensile strength).

The assignee of the present application has, for more than a year, commercially produced rebar reinforced (non-prestressed) octagonal concrete lighting poles employing a clamshell-type mold form. In this process, the clamshell-type mold form is closed onto an elongated rail (i.e., pallet) supported on a pair of light-duty saw horse-like supports formed from lengths of angle iron. An octagonally shaped mold cavity is formed with the pallet top surface forming a lower surface of the resultant mold; the clamshell-type mold form forms six additional mold surfaces and an open top along which the eighth surface of the casting is formed. Concrete is poured and allowed to cure. Once the concrete has firmed-up, hinged halves of the clamshell-type mold form may be opened to permit lateral removal of the mold form from the casting. The mold form can be reused while the casting continues to cure on the pallet. Once curing is substantially complete, the casting may be removed from the pallet for finishing operations, storage, transportation, etc.

Cast concrete structures with substantially increased tensile strength can be obtained through known concrete prestressing techniques. Generally, in such known techniques, concrete is poured around high strength steel wires, cables or rods which are kept under considerable tension until the concrete has substantially completely set. The wires are then cut, and compressive forces are thereby imparted to the concrete through the bond between the steel and concrete. Additional tensile strength in the cast product results from the fact that when the structure receives a load, the compression imparted to the concrete by the prestressing elements is relieved on that portion that would otherwise be put into in tension by the load. In order to assure a strong bond between the tensioned steel wires and the concrete (which is required to avoid slippage), it is necessary to permit the casting to substantially completely cure before the tensioning elements are cut or otherwise disconnected from the tensioning fixture.

For certain high load applications, such as utility and lighting poles to be used in regions susceptible to high winds, e.g., hurricanes, the substantially greater structural strength afforded by prestressed concrete is highly desirable.

As compared with conventional reinforced concrete casting operations, however, known industry techniques for casting prestressed concrete poles are labor and time intensive, and require additional materials (e.g., stressing elements) and costly casting (and tensioning) apparatus.

Pour casting into an open-top mold incorporating prestressing elements has been used to form prestressed concrete structures. As noted above, however, in such processes it has been necessary for the casting to remain in the mold form until the casting is substantially cured, in order to avoid slippage of the tensioned prestressing elements within the concrete. This may take between 16 and 20 hours. With the mold form occupied for this lengthy period of time, production rates per mold form are necessarily very low. To achieve higher production rates, it is necessary to employ additional mold forms (and associated tensioning apparatus), at concomitantly greater expense. Additionally, with apparatus known in the industry, castings having a cross-sectional dimension that reaches a maximum between opposed sides of the casting, e.g., octagonal poles, cannot easily be removed laterally from a mold cavity. Rather, removal of this type of casting from its mold cavity requires either an involved disassembly of the mold form, or an endwise removal operation, i.e., a longitudinal extraction of the casting from the mold form. In order to permit an endwise removal operation, an end wall of the mold form must be disassembled and removed. If the ends of the mold form are reinforced and specially configured to serve also as pretensioning headers, such a removal operation can to be difficult.

Centrifugal (spin) casting can be carried out to cast poles within a mold including tensioned prestressing elements. Such apparatus tend to be very costly, however.

The following patents teach particular apparatus and methods for casting elongated prestressed concrete products utilizing a mold form positioned between, or incorporating therein, headers of a wire pretensioning fixture:

COLLIER U.S. Pat. No. 832,594

DEIGAARD U.S. Pat. No. 3,269,494

CAZENAVE et al. U.S. Pat. No. 4,758,393

COLLIER discloses a mold forming a pair of opposed cavities of L-shaped cross-section, along which wires pretensioned between end brackets extend. Once the casting is set, the tensioned wires are severed at their ends, and the castings (angle posts) are removed from the mold box.

DEIGAARD discloses a mold form of rectangular cross-section intended for casting concrete poles having a longitudinal opening therethrough. The mold form is positioned within a wire pretensioning apparatus including an elongated very heavy base, which is preferably made of concrete and partially embedded in the ground. Pretensioning wires are extended between a pair of headers. The mold form itself is a multi-part open top structure. Once the concrete has hardened to such a point that engagement of the concrete with the tensioned cables will prevent any movement of the cables within the concrete, the cables are cut and the side plates of the mold are dismantled and removed.

CAZENAVE et al. disclose a mold form ("impression") separable from a wire tensioning frame for use in making beams of prestressed concrete. Separability of the impression from the tensioning frame permits removal of the impression from the casting (and tensioning frame) for reuse in casting another beam while the first beam begins to dry. In the disclosed process, the tensioning frame is placed on the impression. Concrete is cast into the mold constituted by the combination of the frame and the impression. The concrete and the mold is vibrated and "rammed." Then, the impression is flipped over together with the tensioning frame, and the impression is removed from the partially cured casting for reuse. The mold form nests within the tensioning frame; the frame comprises sides and ends but no central floor.

SUMMARY OF THE INVENTION

In view of the foregoing, it is a principal object of the present invention to provide improved apparatus and methods for casting prestressed concrete products, particularly prestressed concrete utility poles and like elongated concrete structures.

It is a more specific object of the invention to provide apparatus and methods for casting elongated prestressed concrete structures, which improve production efficiency by permitting reuse of a mold form while a first casting is left undisturbed to continue to cure in a pretensioning fixture that remains stationary.

It is yet another object of the invention to reduce equipment costs by enabling a prestressed concrete pole casting operation to be carried out using clamshell-type mold forms of the same general type previously used for casting non-prestressed concrete poles.

It is a further object of the invention to provide a prestressing element pretensioning fixture of simple easy to use construction, and great strength/rigidity for withstanding considerable wire pretensioning forces, which fixture is usable together with a clamshell-type mold form in such a manner that the form is easily properly locatable on the pretensioning fixture for pouring and initial curing, and easily removable from the pretensioning fixture without disturbing the casting, to thereby permit the casting to continue to cure in the pretensioning fixture during reuse of the mold form.

One or more of the above-stated objects are achieved in accordance with the present invention, by a method of casting elongated prestressed concrete products. A clamshell-type mold form, including two hinged mold halves, is positioned on a first prestressing element pretensioning fixture. The mold halves are closed together over a set of prestressing elements pretensioned in the pretensioning fixture, to form a mold cavity with the prestressing elements extending therealong. Concrete slurry is dispensed into the mold cavity. The concrete slurry is permitted to cure, to thereby form a concrete casting. The mold halves are opened and the mold form is removed from the casting and the pretensioning fixture, after the casting has partially cured. The casting remains on the pretensioning fixture, and the pretensioning fixture remains stationary, during removal of the mold form. The casting is permitted to continue to cure on the pretensioning fixture after removal of the mold form, at least to such point that engagement of the concrete with the pretensioned prestressing elements will prevent movement of the prestressing elements within the concrete. Thereafter, the prestressing elements are released from the pretensioning fixture.

In a second aspect, the invention resides in a production system for carrying out the method described above. The system includes multiple pretensioning fixtures, a clamshell-type mold form, and an overhead conveyor for transporting the mold form as a unit from one of the pretensioning fixtures to another.

In a third aspect, the invention is embodied in a wire pretensioning fixture for use in casting elongated prestressed concrete structures. The fixture comprises a pair of elongated I-beams joined together in side-by-side relation to form a mold form-supporting base. A pair of upstanding headers are provided, one secured at each end of the base. At least one of the headers includes an anchor plate to which ends of tensioned prestressing elements may be secured. The anchor plate is secured between a pair of generally L-shaped side plates having base portions thereof fitted and secured within spaces defined between respective pairs of upper and lower I-beam flanges.

In a fourth aspect, the invention is embodied in an apparatus for casting elongated prestressed concrete products. A pretensioning fixture includes a pair of spaced headers between which prestressing elements may be pretensioned. A clamshell-type mold form including two hinged mold halves is removably positionable on the pretensioning fixture to thereby form a mold cavity along which prestressing elements pretensioned between the headers may extend.

The above and other objects, features and advantages of the present invention will be readily apparent and fully understood from the following detailed description of preferred embodiments, taken in connection with the appended drawings.

BRIEF DESCRIPTION OF THE DRAWINGS

FIG. 9 is a side elevational view of a prestressed concrete utility pole of octagonal cross-section cast with the inventive apparatus and method.

FIG. 10 is an end elevational view of the utility pole shown in FIG. 9

DETAILED DESCRIPTION OF THE PREFERRED EMBODIMENTS

Figure 1:
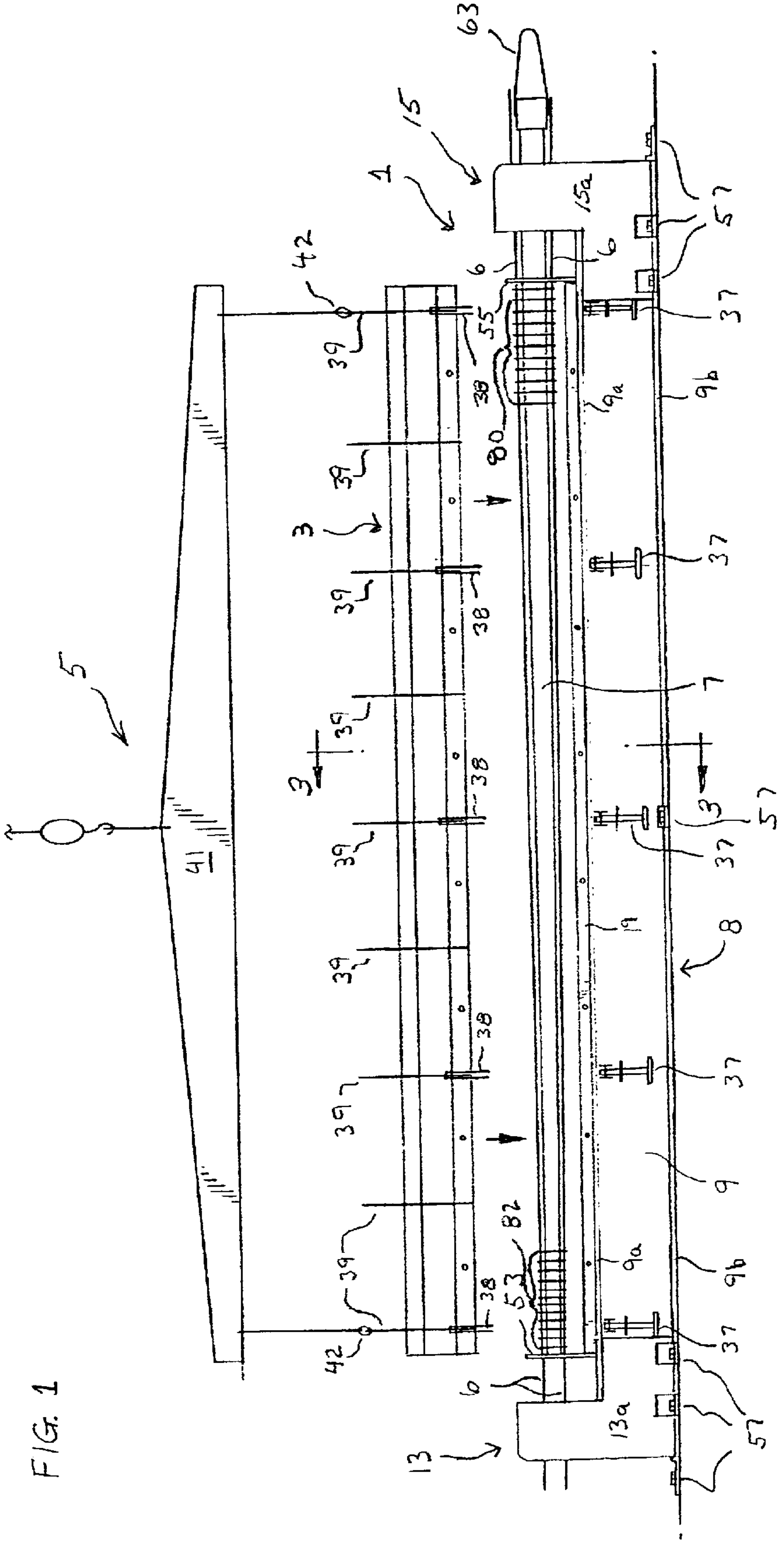
FIG. 1 is a side elevational view of a prestressed concrete casting apparatus in accordance with the present invention, including a clamshell-type mold form suspended by an overhead conveyor above a pretensioning fixture/pallet unit set-up for casting.
Figure 2:
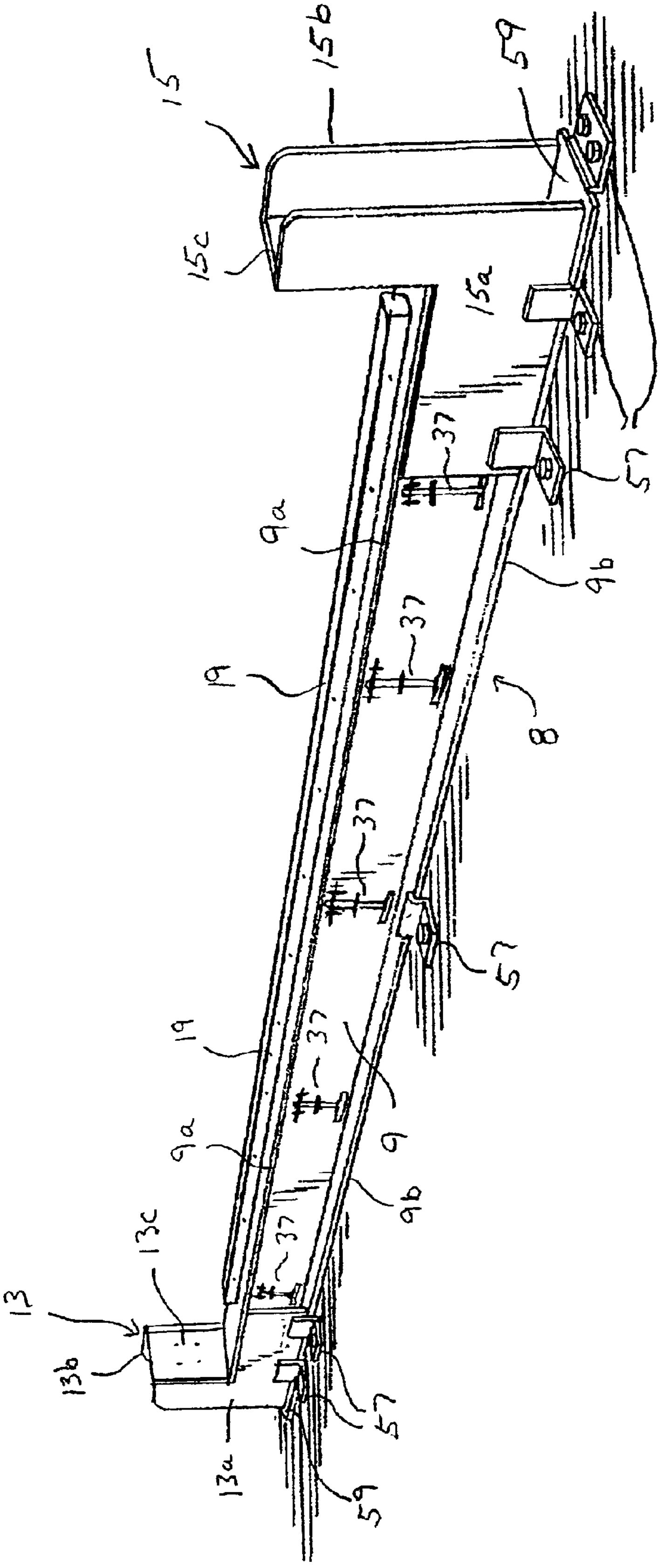
FIG. 2 is a perspective view of a pretensioning fixture/pallet unit as shown in FIG. 1, prior to installation of a plurality of prestressing cables and a mold core.

As seen in FIG. 1, a casting apparatus in accordance with the present invention includes a prestressing element pretensioning fixture 1, a clamshell-type mold form 3 and an overhead conveyor system 5. In the illustrated exemplary casting method and apparatus, preferred for use in the production of hurricane resistant light poles, mold form 3 is configured to form a tapering mold cavity of octagonal cross-section. Pretensioned in pretensioning fixture 1 are four twisted multi-strand steel cables 6 (two seen in FIG. 1). Also seen in FIG. 1, extending within and along the set of cables 6, is a removable mold cure (i.e., mandrel) 7 of tapering cylindrical shape, for creating in the casting a central bore of corresponding shape and size. Obviously, other prestressing elements, e.g., single filament wire or rod, and numbers of prestressing elements, may be used. In addition, the principles of invention may be applied to the casting of poles and other products having various other shapes, e.g., circular, rectagonal, hexagonal, etc. (with or without internal passages).

Advantageously, clamshell-type mold form 3 is usable together with pretensioning fixture 1 in such a manner that form 3 is easily properly locatable on, and removable from, pretensioning fixture 1 by way of conveyor system 5, while pretensioning fixture 1 remains stationary. By maintaining pretensioning fixture 1 stationary, the integrity and stability of the pretensioning fixture under the considerable forces set-up upon pretensioning the cables 6 is substantially increased. In accordance with the invention, one casting is permitted to remain stationary and continue to cure in pretensioning fixture 1, while mold form 3 is removed and replaced on another pretensioning fixture, for carrying out a subsequent casting operation.

Pretensioning fixture 1 has an elegant construction of great strength and rigidity for withstanding substantial cable pretensioning forces. As seen clearly in FIGS. 1–4, pretensioning fixture 1 includes a heavy-duty base 8 which is constructed by adjoining a pair of elongated I-beams 9, 11 in parallel, side-by-side, relationship with each other. Preferably, the adjoining edges of upper and lower I-beam flanges 9*a*, 11*a*; 9*b*, 11*b* are welded to each other along their lengths. In a preferred embodiment, I-beams 9, 11 are W18×50 ASTM A-36 steel I-beams. Affixed at the opposite ends of base 8 are a pair of upstanding headers 13, 15 formed of heavy gauge steel plates (e.g., 2" thickness), between which a set of prestressing elements (e.g., the four cables 6) are extended.

The headers are arranged in general mirror image relation with each other. Each is preferably formed of a pair of upstanding generally L-shaped side plates 13*a*, 13*b*; 15*a*, 15*b*. A third (anchor) plate 13*c*, 15*c* extends orthogonally between the respective pairs of side plates, in or adjacent a vertical plane passing through the inside comers defined by the side plates' L-shape. The horizontally extending leg (base) portion of each L-shaped side plate 13*a*, 13*b*; 15*a*, 15*b* is made to fit within the space defined between a respective pair of upper and lower I-beam flanges 9*a*, 9*b*; 11*a*, 11*b*, and is welded to the same along its upper and lower edges. I-beams 9, 11 terminate at the aforesaid vertical plane, such that upper I-beam flanges 9*a*, 11*a* fit into the inside comers defined by the side plates' L-shape. This integral construction of adjoined I-beams 9, 11 and headers 13, 15 is elegant in its simplicity and in the great strength and rigidity it affords for withstanding the considerable forces set-up by the pretensioning of cables 6.

Figure 5:
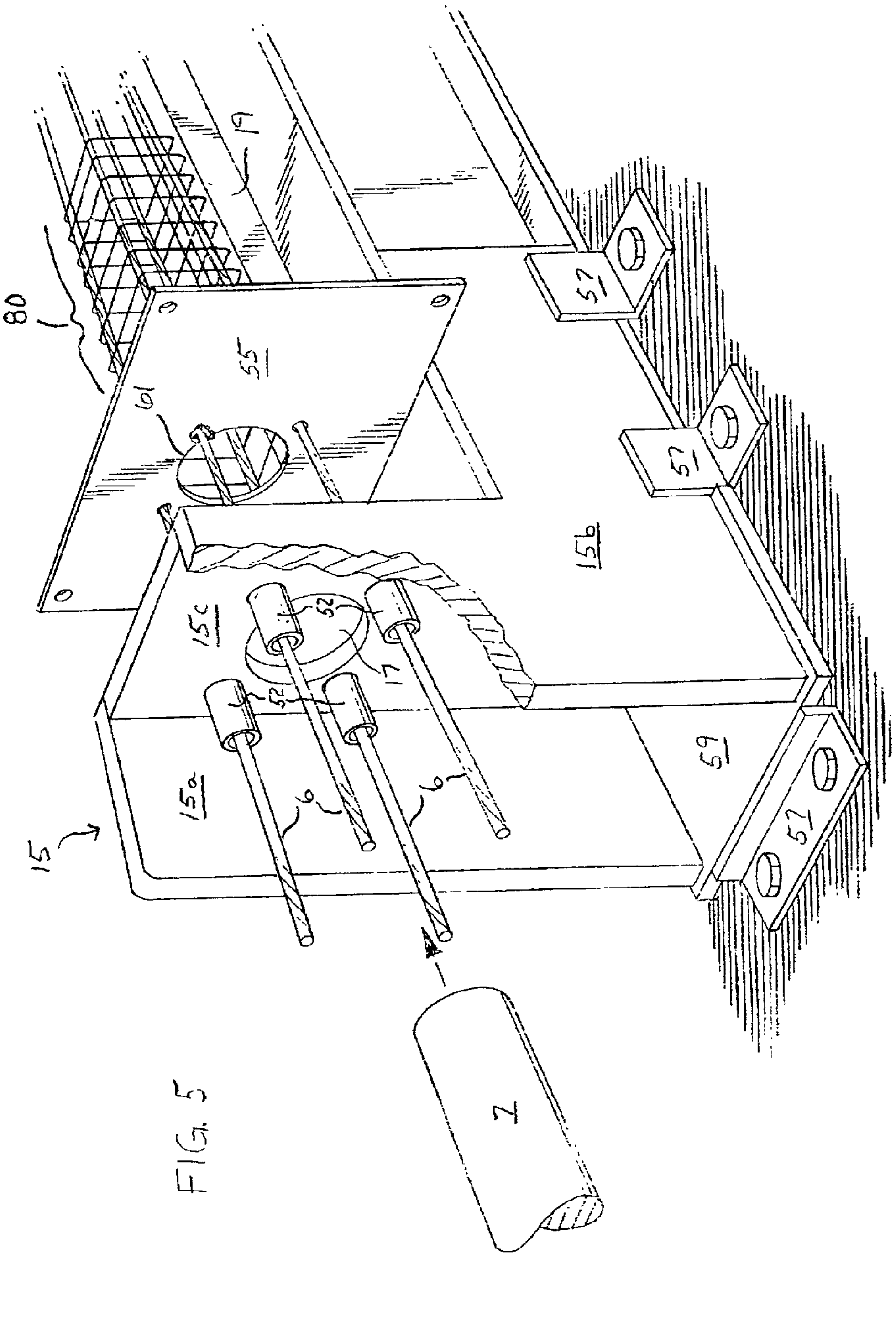
FIG. 5 is a partial perspective view of a mold core insertion end of the pretensioning fixture/pallet unit; the unit is set-up with tensioned prestressing cables, and a mold core is shown ready for insertion.
Figure 6:
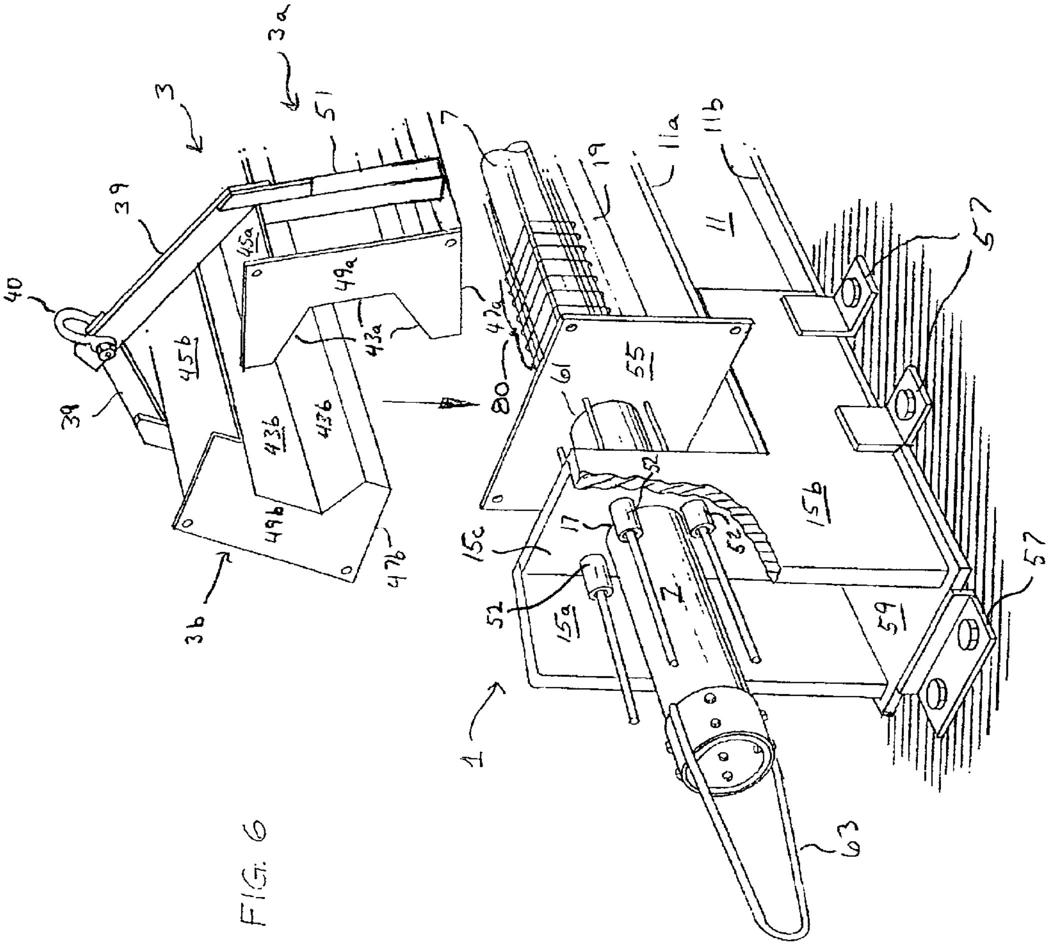
FIG. 6 is a partial perspective view of the pretensioning fixture/pallet unit end shown in FIG. 5, with the mold core inserted and the clamshell-type mold form being lowered onto the pretensioning fixture/pallet unit.

Header 15 is located at a core insertion end of pretensioning fixture 1, and is illustrated more clearly in FIGS. 5 and 6. Header 13, located at the opposite end of fixture 1, is illustrated more clearly in FIG. 7. It will be noted that the construction of the two headers is generally the same. However, while each anchor plate 13*c*, 15*c* has four apertures (arranged at corners of a square) for passage of pretensioning cables 6 therethrough, anchor plate 15*c* additionally has a relatively large central aperture 17 for permitting passage therethrough of mold core 7. Upon insertion, core 7 terminates at or short of header 13. Thus, no similar aperture is provided in anchor plate 13*c*.

In a preferred embodiment, pretensioning fixture 1 is sized and configured such that the distance between the two anchor plates 13*c*, 15*c* is approximately two feet greater than the length of the pole to be cast. This extra length serves to accommodate mold end plate assemblies, and to provide clearances for cutting the cables, as will be described.

Figure 3:
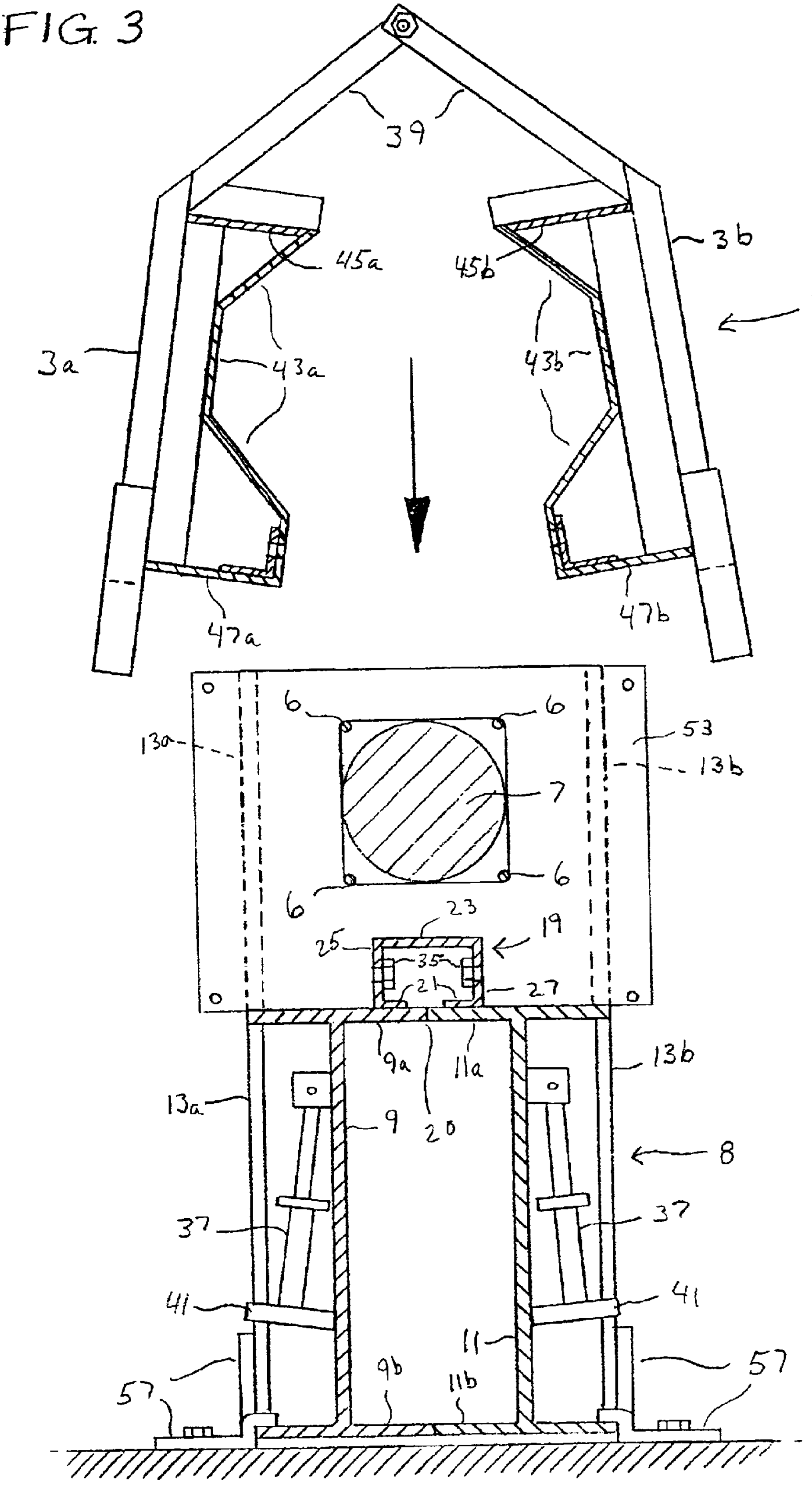
FIG. 3 is a cross-sectional view taken on line 3—3 of FIG. 1, illustrating the clamshell-type mold form with halves thereof opened and being lowered onto the pretensioning fixture/pallet unit.
Figure 4:
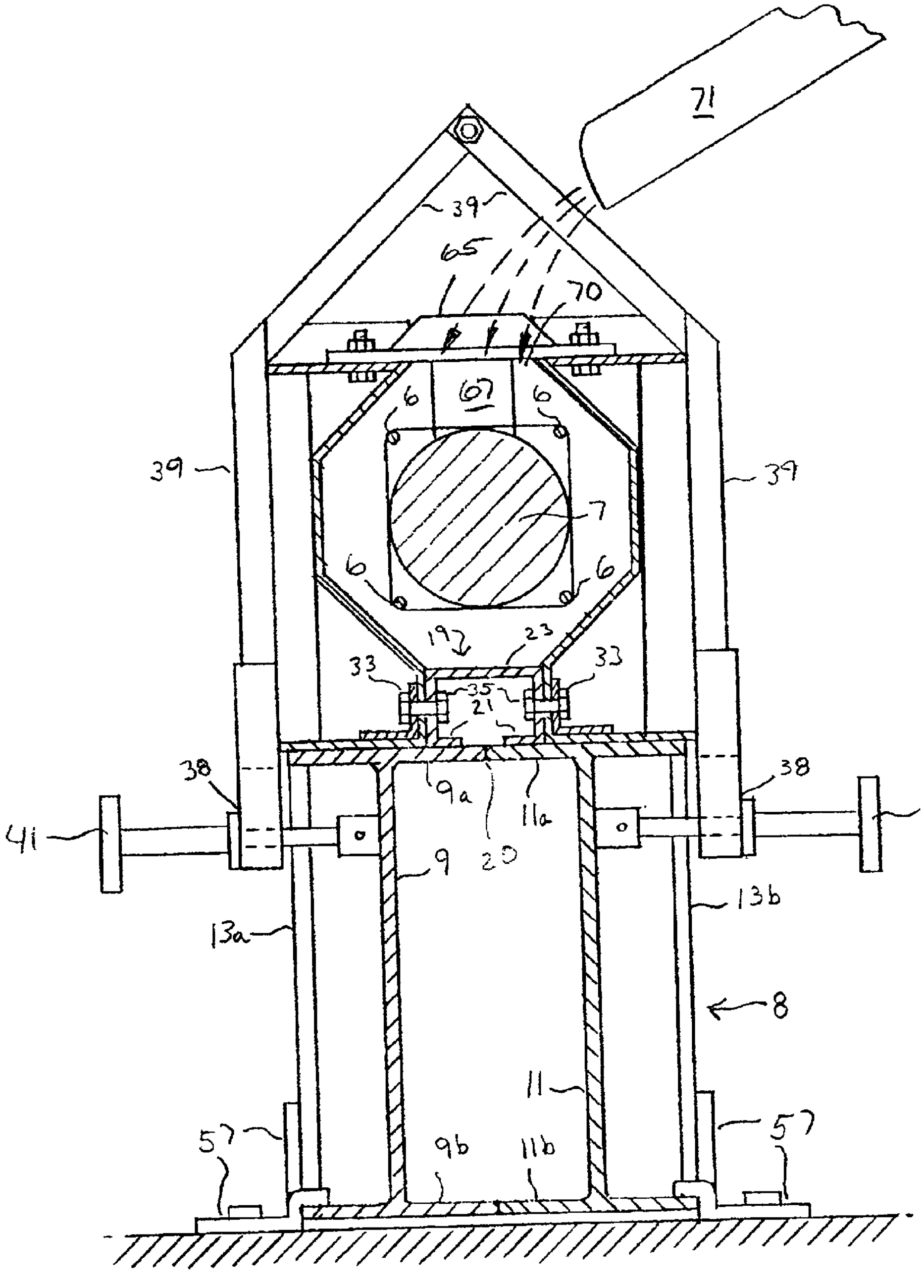
FIG. 4 is a cross-sectional view taken at the same point as FIG. 3, but illustrating the clamshell-type mold form secured on the pretensioning apparatus/pallet unit, to thereby form a mold cavity ready for pouring (including the pretensioning cables and mold core extending therealong).

The inventive casting apparatus preferably further includes a rail-like structure ("pallet") 19 extending along and secured to a central upper surface of base 7. In the preferred embodiment, pallet 19 is a generally rectangular structure formed from angle iron or the like. Pallet 19 is centered on base 8 and bridges an upper weld seam 20 connecting the pair of I-beams 9, 11. As best seen in FIGS. 3 and 4, inwardly directed bottom flanges 21 of pallet 19 stop short of weld seam 20, and are preferably welded to corresponding top surfaces of I-beam flanges 9*a*, 11*a*, at spaced locations along their lengths.

Figure 7:
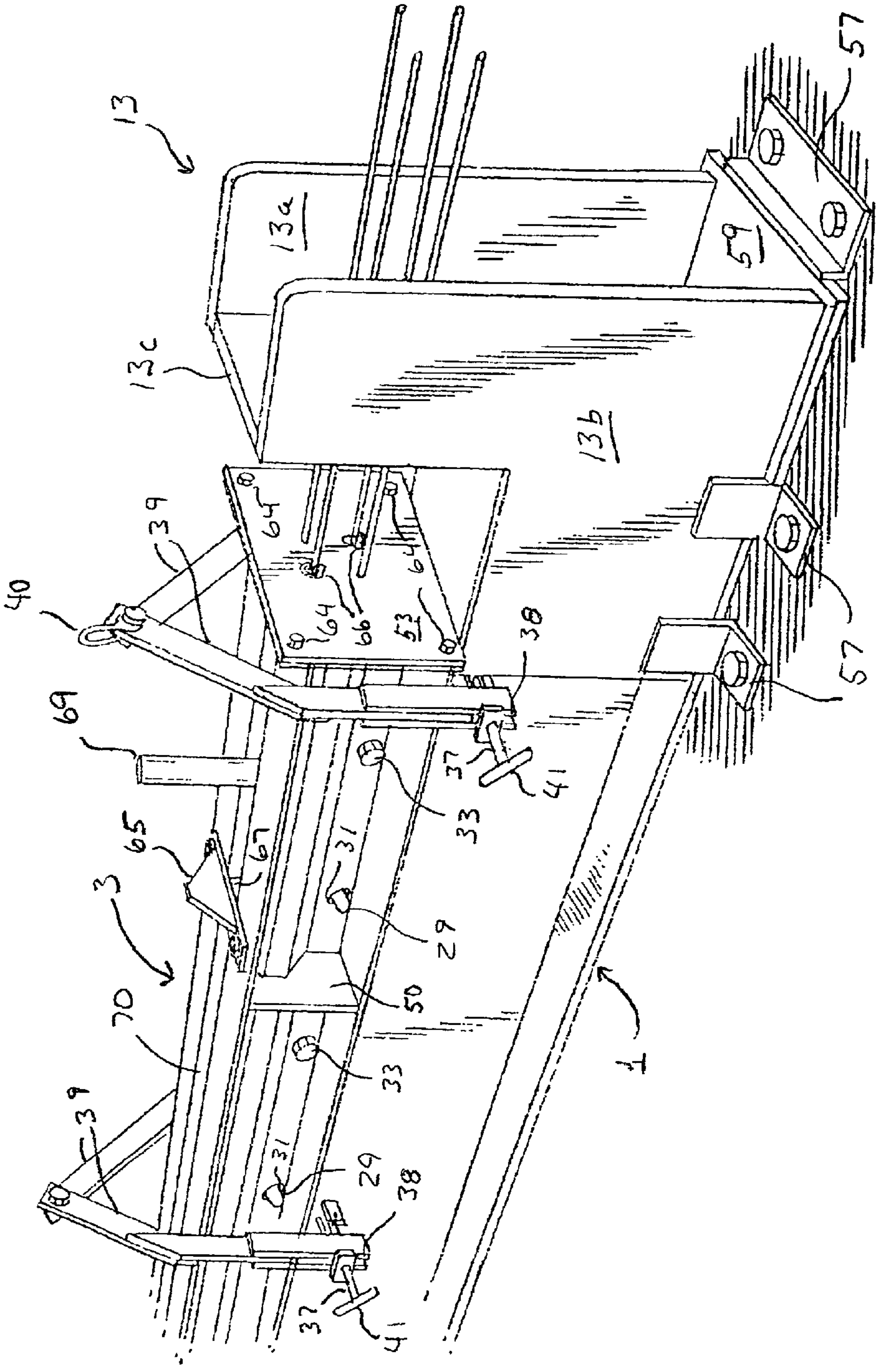
FIG. 7 is a partial perspective view of the pretensioning fixture/pallet unit end opposite that illustrated in FIG. 6, with the clamshell-type mold form secured on the pretensioning fixture/pallet unit to form a mold cavity ready for pouring.

Pallet 19 has an upper horizontal surface 23 that serves as a lower face of the octagonal mold. In addition, vertical side surfaces 25, 27 of pallet 19 serve to provide mounting locations against which lower portions of opposing halves of mold form 3 may engage. Referring to FIG. 7, side surfaces 25, 27 preferably include spaced pins 29 which locate within holes 31 provided at spaced locations along the length of mating lower portions of mold halves 3*a*, 3*b*. In addition, pallet 19 is preferably adapted to receive, at spaced positions along its length, a bolt 33 or like fastener to tightly secure mold form 3 to the pallet side surfaces 25, 27. As seen in FIGS. 3 and 4, a series of nuts or the like may be weldably secured to inside surfaces of pallet 19, to receive corresponding bolts 33 passed through the mating lower portions of mold halves 3*a*, 3*b*.

As seen in FIGS. 1–4, 7 and 9, additional structural integrity of the mold form/pallet assembly is preferably provided by a series of swinging clamps 37 pivotably mounted at spaced positions along outside web portions of adjoined I-beams 9, 11. Once mold form 3 is positioned on pretensioning fixture 1 with its halves 3*a*, 3*b* closed onto pallet side surfaces 25, 27, clamps 37 may be swung upwardly to engage within corresponding end slots 38 formed in extensions included as part of selected (e.g., alternating—see FIG. 1) ones of a plurality of lifting/spreader arms 39 of clamshell-type mold form 3. Clamps 37 may be threadably tightened down against the slotted extensions by way of a T-shaped torquing handle 41 of the clamps 37.

By inclusion of the above-described mold locating and lock-down means, including holes 31 for receiving pins 29 and bolts 33, and lifting/spreader arm extensions providing slots 38 for receiving swinging clamps 33, mold form 3 of the invention represents an advantageous adaption of the mold form previously used to cast non-prestressed concrete poles (see the Background section) which is well suited for the casting of high quality prestressed concrete poles.

Figure 8:
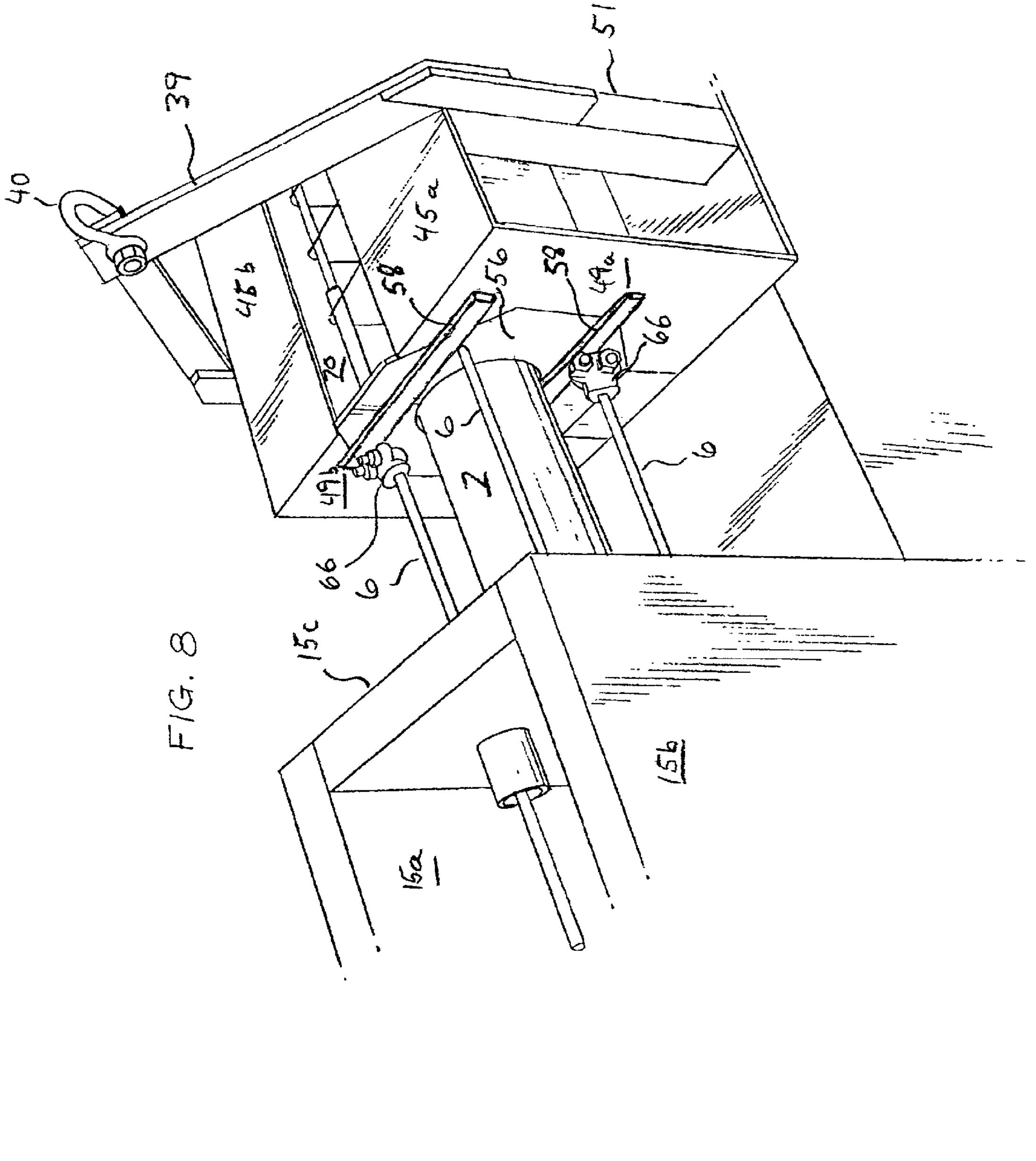
FIG. 8 is a close-up partial perspective view illustrating an alternative embodiment of a mold form end plate in accordance with the present invention.

Clamshell-type mold form 3 is now described in further detail. Mold form halves 3*a*, 3*b* are hingedly connected to each other by a series of spaced lifting/spreader arms 39. In a preferred embodiment, and as shown in FIG. 1, nine lifting/spreader arms 39 are generally equi-spaced along the length of mold form 3. The two arms 39 located at the opposite ends of mold form 3 are equipped with an eye 40 (see FIGS. 6–8) for attachment of respective connectors 42 (e.g., hooks or shackles—see FIG. 1) of conveyor system 5. In particular, connectors 42 are mounted at the ends of a shallow, generally triangular, yoke 41 which is connected at its top-center to tackle of an overhead hoist (described below in connection with FIG. 11).

As best seen in FIGS. 3, 4 and 6, mold halves 3*a*, 3*b*, are formed from sheet metal as open-backed, elongated trough-like structures. Each mold half has a multi-paneled plate structure 43*a*, 43*b* providing a respective set of three faces of the octagonally shaped mold cavity (formed when mold form 3 is secured to pallet 19). Plate structures 43*a*, 43*b* are supported between upper and lower framing plates 45*a*, 47*a*; 45*b*, 47*b*, which extend along the length of the respective mold halves 3*a*, 3*b*. End frame plates 49*a*, 49*b* (see FIG. 6) are located at the opposite ends of mold halves 3*a*, 3*b*. Upstanding bulkhead-like reinforcement plates 50 (see FIG. 7), and/or pillars 51 (see FIG. 6), are secured, e.g., by welding, between the upper and lower framing plates 45*a*, 47*a*; 45*b*, 47*b*, at spaced locations along the lengths of the mold halves. In addition to increasing the structural integrity and dimensional stability of the mold halves, such reinforcement members may be used to provide attachment locations for lifting/spreader arms 39 (e.g., as seen in FIG. 6).

To pretension cables 6 in pretensioning apparatus 1, the cables are first passed through one of the anchor plates, e.g., anchor plate 13*c*, threaded through a first mold end plate 53 (see FIG. 7), extended along base 5, threaded through a second (opposite) mold end plate 55 (see FIG. 5 and 6), and finally passed through anchor plate 15*c* of opposing header 15. Once first ends of cables 6 are anchored to anchor plate 13*c*, a conventional cable pulling apparatus (e.g., hydraulically actuated cable pullers as are available from SPX Power Team of Owatonna, Minn.) is braced against an outside surface of opposing anchor plate 15*c*, and actuated to sequentially pull cables 6 to achieve the desired tension. Once the desired tension is reached, the “pulled” ends of the cables are anchored to anchor plate 15*c*. The anchoring of cables 6 to each of the by opposing anchor plates 13*c*, 15*c* can be accomplished by appropriate placement on the cables of a known type of collet 52 (see FIGS. 5 and 6) or other type of retaining ring, U-bolt clamp, chuck or the like, in abutting relation with the outside surfaces of the anchor plates 13*c*, 15*c*.

In the illustrated exemplary method and apparatus for casting concrete poles of octagonal cross-section, each of the four cables is preferably tensioned to approximately 28,900 lbs. This results in a bending moment acting on the opposite ends of adjoined I-beams 9, 11 of approximately 246,000 ft.-lbs. The I-beams should be able to withstand this load with a maximum deflection of 0.01 in. Additional strength and rigidity of pretensioning apparatus 1 is preferably obtained through the use of steel brackets 57 bolted to a reinforced concrete foundation (which is preferably 8"–10" thick) and welded, respectively, to a bottom platform 59 of each header 13, the L-shaped side plates, and at spaced locations along the lengths of the lower I-beam flanges 9*b*, 11*b*.

Once cables 6 are pretensioned on pretensioning fixture 1, core 7 is inserted endwise through anchor plate aperture 17, and a corresponding aperture 61 provided in mold end plate 55. Then, core 7 is advanced along base 5, centered within the set of four tensioned cables 6, and is preferably threaded through a series of reinforcing hoops 80, 82, which are ultimately wrapped about the cables at opposite end portions of the mold cavity, as seen in FIGS. 1, 5 and 6. Insertion of core 7 is completed when the distal end of the core abuts with opposing mold end plate 53. Alternatively, the core may be sized to fall short of plate 53 upon full insertion, in order to provide a solid tip portion (e.g., 18" in length) of the pole to be cast. Upon completing the core insertion, a bent rebar pull-handle 63 attached to the proximal end of core 7 will reside adjacent header 15, as seen in FIGS. 1 and 6. Core 7 can be constructed as a hollow or solid mandrel, from various known materials exhibiting low adhesion to curing concrete, e.g., polished aluminum.

Set-up of mold form 3 for casting is a simple matter of pivoting mold halves 3*a*, 3*b* to an open position, lowering the mold form 3 over the set of cables 6 pretensioned in fixture 1, closing the mold halves over cables 6 and locating and removably securing the mold halves to the side surfaces 25, 27 of pallet 19. The locating and securing is preferably accomplished by way of previously described pins 29, bolts 33 and swing-up clamps 37.

In order to complete formation of an octagonal mold cavity along which tensioned cables 6 extend, the open ends of the tubular structure formed by the mold form/pallet combination are closed-off by securement of rectangular end plates 53, 55 against end frame plates 49*a*, 49*b* at each end of mold form halves 3*a*, 3*b*. As shown in FIG. 7, suitable securement can be accomplished through a bolted or other direct connection 65 of end plates 53, 55 to end frame plates 49*a*, 49*b*, and/or by suitable placement of cable gripping U-clamps 66 or the like on two or more of pretensioned cables 6, so as to hold end plates 53, 55 against the respective end frame 49*a*, 49*b*. In place of rectangular end plates 53, 55, which reside outside of the mold cavity, octagonally shaped mold end plates 56 (one shown in FIG. 8) may be secured within the open ends of the tubular structure formed by the mold form/pallet combination. In this embodiment, a pair of flat bars 58 are secured to mold end plates 56 and have laterally protruding end portions which abut with end frames 49*a*, 49*b*, to properly position end plate 56 flush within frames 49*a*, 49*b*. With this arrangement, end plates 56 are braced against displacement away from the mold cavity by U-clamps 66, and are braced against displacement into the mold cavity by bars 58.

Next, as seen in FIGS. 4 and 7, one or more mold core retaining structures 65 are preferably mounted to the upper frame plates 45*a*, 45*b* of mold halves 3*a*, 3*b* to span the open top 70 of the mold cavity, at spaced locations therealong. Core retaining structure 65 includes a small spacer element 67 that extends down to abut against an upper side portion of mold core 7, to thereby prevent upward deflection or “floating” of mold core 7 within the concrete slurry during pouring and curing. As seen in FIG. 4, the lower end of spacer 67 is preferably contoured to match the curvature of the mold core. A small void in the casting results from the presence of spacer element 67; that void is filled with a small amount of concrete slurry in a finishing operation. In addition, if one or more lateral passages within the cast pole are desired, secondary mold cores may be suitably positioned within the mold cavity. Such secondary mold cores may include, as shown in FIG. 7, a length of PVC or galvanized steel pipe 69, or the like, extending from mold core 7 and out of the mold cavity through open top 70.

As illustrated in FIG. 4, the mold cavity is preferably filled with ready-mix concrete slurry by pouring along open top 70 of the thus formed mold cavity, to fill the mold cavity. The pouring may be conducted by way of a chute 71 extending from a ready-mix concrete mixer. The slurry is then preferably vibrated by inserting a conventional wand-like vibrator into the concrete slurry at several spaced points along the elongated mold cavity. For example, vibration may be carried out in 5–10 second durations at multiple points spaced 1–2 ft from each other. Excessive vibration should be avoided as it may cause separation of aggregate in the concrete mix.

Following pouring and vibration, the slurry is allowed to begin to set-up. Mold core 7 should be removed within 20–30 minutes following the pour, to avoid excessive adhesion of the concrete thereto. Once the casting has become firm (typically after approximately 2–3 hours), clamshell mold form 3 may be removed from the resultant casting and pretensioning fixture 1. In accordance with the invention, removal of mold form 3 is carried out while the casting remains secured on pretensioning fixture 1 by cables 6, which remain tensioned between headers 13, 15. This permits mold form 3 to be removed for reuse, without waiting for the casting to cure to the point at which the prestressing cables are securely engaged within the concrete.

Removal of mold form 3 is accomplished essentially by reversing the mold form set-up steps previously described, i.e., by removing retaining structures 65 and any secondary mold cores 69, releasing mold form 3*a*, 3*b* from the mold end plates 53, 55, and pallet 19, then opening mold form 3 and withdrawing it vertically. Advantageously, the vertical mold form placement and removal operations can be carried out by lowering and raising the clamshell-type mold form (as a unit) with overhead conveyor system 5. Conveyor system 5 is also advantageously used to relocate mold form 3 onto another pretensioning fixture, where a subsequent casting operation can be carried out while the first casting continues to cure on its pretensioning fixture 1. The casting is thus permitted to continue to cure, at least to the point at which a secure engagement of the concrete with the cables is obtained, so as to prevent any movement of cables 6 within the concrete once cables 6 are cut or otherwise released from the pretensioning fixture. Once sufficient curing has taken place, cables 6 are preferably released from pretensioning fixture 1 by cutting (e.g., with a welding torch). Cutting is carried out within the clearances provided between the mold end plates 53, 55 and their respective anchor plates 13*c*, 15*c*. Thereafter, the casting can be removed for finishing operations, storage, transportation, etc.

A prestressed concrete light pole 73 successfully cast with the method and apparatus of the invention is shown in FIGS. 9 and 10. The overall pole length is 33 feet. The approximate weight of the finished pole is 1,700 pounds. The maximum width, at the base of pole 73, is 11.6". The pole tapers evenly along its length to an opposite (top) end having a width of 6.0". An internal bore 75 of pole 73 tapers evenly from 6.6" to 2.0". Secondary mold cores were utilized to form upper and lower lateral passages 77, 79, extending at right angles to each other. To provide a lateral through-passage 77 intersecting with bore 75, a lateral through-hole may be provided in mold core 7. This permits a secondary (lateral) mold core to pass from the open top of the mold cavity to the opposite side.

The incorporated prestressing elements are multi-strand steel cables: four ½" diameter P.T. strands (270 Grade, Lo-Lax ASTM A-416), pretensioned, respectively, to 28,900 lbs. The top ten feet of the cables masked (i.e., covered) to prevent grip of the cable with the concrete at the relatively thin top portion of the tapered pole. Fifteen #3 hoops 80 at 4" spacings (see FIGS. 1, 5 and 6) are preferably used in the lower five feet of the pole as reinforcing wraps around the four pretensioning cables. Six smaller #3 hoops 82 at 4" spacings (see FIG. 1) are similarly used as reinforcement in a two foot portion at the upper end of the pole. Instead of individual hoops, continuous wire spirals providing similar structural reinforcement characteristics may be used.

Poles 73, cast with ASTM specification ready-mixed concrete (C94), conform with P.R.E.P.A. specifications for concrete poles. The minimum compressive strength for the concrete used was 5,000 psi, determined in accordance with the ASTM method of test for compressive strength of molded concrete cylinders (C39–tests to be performed at 28 days). The poles are rated at a maximum wind load of 125 M.P.H., an ultimate resisting moment of 34,570 ft.-lb., and a working moment 17,285 ft-lb. (standard PCI testing with lateral load applied 2' from pole tip, and base of pole buried to 5'; 2.5 $ft^2$ projected accessories surface area).

Figure 11:
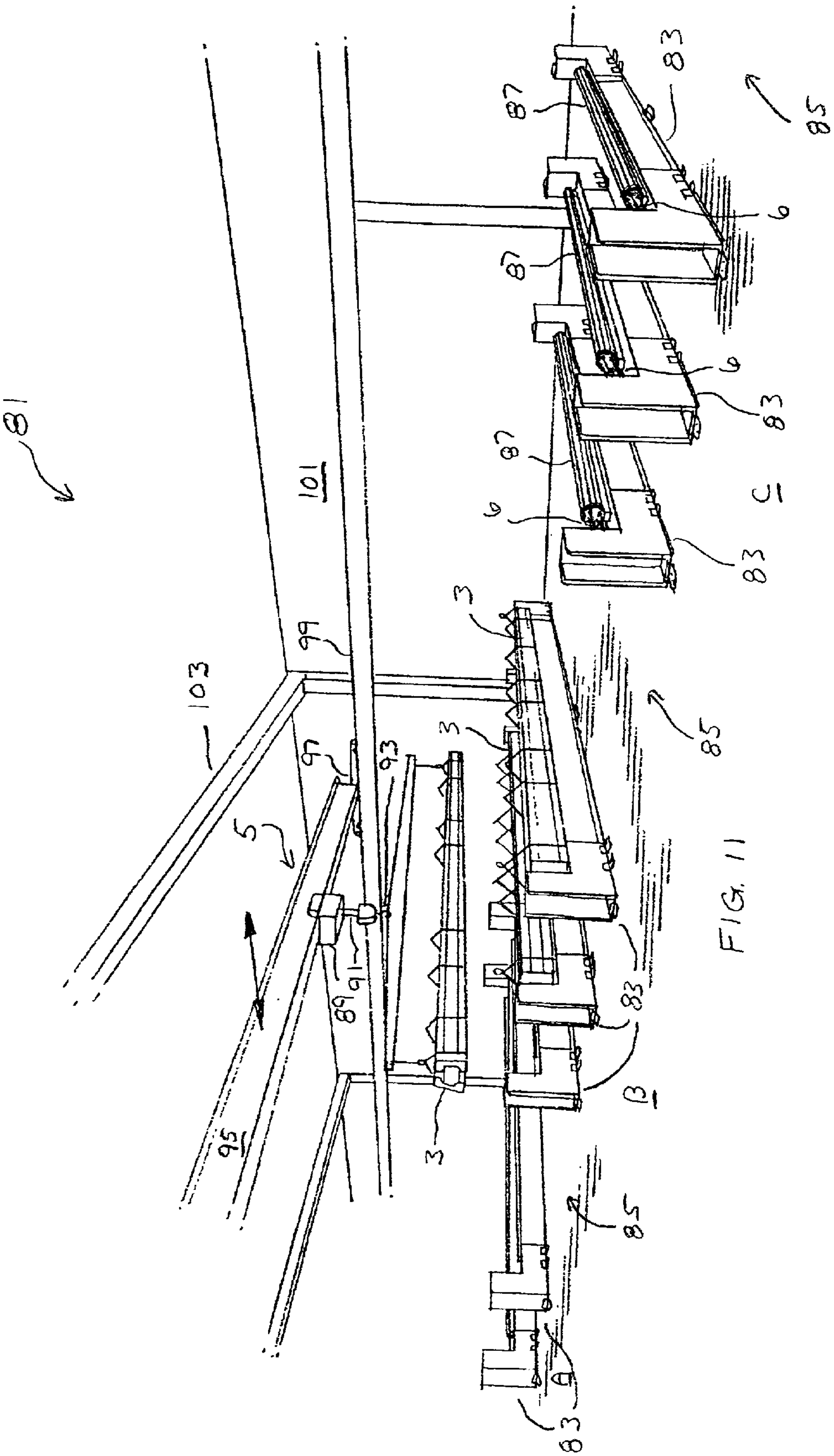
FIG. 11 is a simplified perspective view of an overall production system in accordance with the invention, including a plurality of pretensioning fixture/pallet units, a clamshell-type mold form and an overhead conveyor for moving the clamshell-type mold form from one pretensioning fixture/pallet unit to another.

FIG. 11 illustrates a production system 81 in accordance with the invention, wherein a plurality of pretensioning fixture/pallet units 83 are organized into groups (e.g., of two to three units) spaced apart from each other by lanes 85. Lanes 85 are preferably sufficiently large to accommodate a ready-mix concrete mixing truck (not shown). With this arrangement, pouring of concrete slurry into multiple mold cavities within a given group (A, B or C) may be carried out by way of a chute 71 (see FIG. 4) extending from a concrete mixing truck parked within one of lanes 85. Once the castings of a given group, e.g., castings 87 of group C, have firmed-up, the mold forms 3 can be removed by overhead conveyor system 5, and replaced on the pretensioning fixture/pallet units 83 of a second group, e.g., group B, where subsequent casting operations can be carried out. In the meantime, as shown, castings 86 of group C can continue to cure with cables 6 maintained in tension between the headers 13, 15 of the pretensioning fixtures 1. (As depicted, cables 6 extend through octagonal mold end plates of the type shown in FIG. 8.)

As shown in FIG. 11, overhead conveyor system 5 preferably includes a motorized hoist 89 by which a line (e.g., cable or chain) 91 may be extended and retracted to raise and lower a hook 93 secured to yoke 41. Hoist 89 is preferably mounted for movement along a beam 95 extending parallel to the pretensioning fixture/pallet units 83. In turn, beam 95 is preferably supported at its ends for movement perpendicular to pretensioning fixture/pallet units 83, by way of roller trolleys 97 (one shown) movable along on rails 99 (one shown). In a preferred embodiment, beam 95 and rails 99 are incorporated into a steel frame building 101 including a roof structure 103 providing overhead protection from the elements, and at least one open side permitting entry and exit of one or more ready-mix concrete mixing trucks.

From the foregoing, it will be appreciated that the invention can greatly improve production efficiency relative to prior art prestressed concrete casting methods requiring the mold form to remain on the casting until the casting is substantially completely cured. Difficulties associated with movement of the pretensioning apparatus to obtain release of the casting are also avoided.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. A method of casting elongated prestressed concrete products, comprising:

positioning a clamshell-type mold form, including two hinged mold halves, onto a first prestressing element pretensioning fixture;

closing the mold halves together over a set of prestressing elements pretensioned in the pretensioning fixture, to form a mold cavity with said prestressing elements extending therealong;

dispensing concrete slurry into the mold cavity;

permitting said concrete slurry to cure, to thereby form a concrete casting;

opening the mold halves and removing the mold form from the casting and the pretensioning fixture, after the casting has at partially cured, said casting remaining on said pretensioning fixture, and said pretensioning fixture remaining stationary, during said removing of the mold form;

permitting said casting to continue to cure on said pretensioning fixture after removal of the mold form, at least to such point that engagement of the concrete with the pretensioned prestressing elements will prevent movement of the prestressing elements within the concrete; and thereafter releasing said prestressing elements from said pretensioning fixture.

2. A method according to claim 1, wherein after said removing of the mold form, the mold form is repositioned on a second pretensioning fixture where a further casting operation can be carried out while said casting continues to cure on the first pretensioning fixture.

3. A method according to claim 1, wherein said closing of the mold halves forms a mold cavity having an octagonally shaped cross-section.

4. A production system for carrying out a method according to claim 2, said system including multiple pretensioning fixtures, a clamshell-type mold form, and an overhead conveyor for transporting the mold form as a unit from one of said pretensioning fixtures to another.

* * * * *